US010050480B2

(12) United States Patent
Köhler et al.

(10) Patent No.: US 10,050,480 B2
(45) Date of Patent: Aug. 14, 2018

(54) AXIAL FLUX MACHINE HAVING A LIGHTWEIGHT DESIGN

(71) Applicant: SIEMENS AKTIENGESELLSCHAFT, München (DE)

(72) Inventors: Marco Köhler, Hersbruck (DE); Korbinian Petermaier, München (DE); Marco Schramm, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 361 days.

(21) Appl. No.: 14/783,754

(22) PCT Filed: Apr. 3, 2014

(86) PCT No.: PCT/EP2014/056712
§ 371 (c)(1),
(2) Date: Oct. 9, 2015

(87) PCT Pub. No.: WO2014/166811
PCT Pub. Date: Oct. 16, 2014

(65) Prior Publication Data
US 2016/0072343 A1    Mar. 10, 2016

(30) Foreign Application Priority Data

Apr. 12, 2013   (DE) .................. 10 2013 206 593

(51) Int. Cl.
*H02K 3/04* (2006.01)
*H02K 1/18* (2006.01)
(Continued)

(52) U.S. Cl.
CPC .............. *H02K 1/182* (2013.01); *H02K 1/14* (2013.01); *H02K 3/18* (2013.01); *H02K 21/24* (2013.01)

(58) Field of Classification Search
CPC ........ H02K 1/182; H02K 1/2793; H02K 3/47; H02K 16/025; H02K 16/02
(Continued)

(56) References Cited

U.S. PATENT DOCUMENTS 6,538,356 B1 *   3/2003   Jones ................. H02K 3/02
                                                  310/201
8,436,506 B2 *   5/2013   Wang ............... H02K 15/0081
                                                  228/115
(Continued)

FOREIGN PATENT DOCUMENTS

CN       101267147 A       9/2008
CN       102396138 A       3/2012
(Continued)

OTHER PUBLICATIONS

Chinese Office Action for related Chinese Application No. 201480020841.7 dated Mar. 22, 2017, with English Translation.
(Continued)

*Primary Examiner* — Forrest M Phillips
(74) *Attorney, Agent, or Firm* — Lempia Summerfield Katz LLC

(57) ABSTRACT

An electrical axial flux machine including a rotor shaft is provided. The rotor shaft is rotatable about an axis of rotation. Two rotors are arranged on the rotor shaft. The two rotors are spaced apart when viewed in a direction of the axis of rotation. The axial flux machine further includes a stator arranged between the two rotors when viewed in the direction of the axis of rotation. The stator includes stator teeth. Each of the stator tooth extends in the direction of the axis of rotation between two end regions. The stator teeth are arranged and distributed uniformly around the axis of rotation at a radial spacing from the axis of rotation and include a stator winding system. At least one ring structure is provided connecting the two end regions of the stator teeth.
(Continued)

A housing further surrounds the stator radially on the outside.

16 Claims, 5 Drawing Sheets

(51) Int. Cl.
  *H02K 21/24* (2006.01)
  *H02K 1/14* (2006.01)
  *H02K 3/18* (2006.01)

(58) Field of Classification Search
  USPC ....... 310/208, 195, 196, 197, 198, 199, 200, 310/201, 202, 203, 204, 205, 206, 207
  See application file for complete search history.

(56) References Cited

U.S. PATENT DOCUMENTS

| | | | | |
|---|---|---|---|---|
| 8,680,736 | B2* | 3/2014 | Wang | H02K 1/14 310/216.045 |
| 8,791,616 | B2* | 7/2014 | Canini | H02K 1/14 310/156.32 |
| 9,438,092 | B2* | 9/2016 | Becker | B62M 6/55 |
| 2003/0057796 | A1* | 3/2003 | Fan | H02K 1/148 310/216.062 |
| 2006/0043821 | A1* | 3/2006 | Kojima | H02K 1/14 310/268 |
| 2008/0278019 | A1 | 11/2008 | Lu et al. | |
| 2010/0148611 | A1 | 6/2010 | Wang et al. | |
| 2011/0309694 | A1* | 12/2011 | Woolmer | H02K 21/24 310/44 |
| 2011/0316381 | A1* | 12/2011 | Asano | H02K 1/148 310/216.045 |
| 2013/0154397 | A1* | 6/2013 | Sullivan | H02K 21/00 310/12.18 |

FOREIGN PATENT DOCUMENTS

| | | |
|---|---|---|
| DE | 19847813 A1 | 4/2000 |
| DE | 10048492 A1 | 4/2002 |
| DE | 10140362 A1 | 3/2003 |
| GB | 2468019 A | 8/2010 |
| JP | 2010246171 A | 10/2010 |
| TW | 459436 B | 10/2001 |
| WO | WO9609680 A1 | 3/1996 |
| WO | WO03094328 A1 | 11/2003 |
| WO | WO2010092402 A1 | 8/2010 |

OTHER PUBLICATIONS

German Office action for related German Application No. 10 2013 206 593.0, dated Dec. 16, 2013, with English Translation.

PCT International Search Report and Written Opinion of the International Searching Authority dated May 13, 2015 for corresponding PCT/EP2014/056712.

Woolmer T. J. et al: Analysis of the Yokeless and Segmented Armature Machine, Electric Machines & Drives Conference, IEMDC '07, IEEE, vol. 1, pp. 704-708, XP031114922, ISBN: 978-1-4244-0742-2, 2007.

\* cited by examiner

AXIAL FLUX MACHINE HAVING A LIGHTWEIGHT DESIGN

CROSS-REFERENCE TO RELATED APPLICATION

This application is the National Stage of International Application No. PCT/EP2014/056712, filed on Apr. 3, 2014, which claims priority to DE102013206593.0, filed Apr. 12, 2013, both of which are hereby incorporated by reference in their entirety.

BACKGROUND

The present embodiments relate to an electrical axial flux machine.

Such an axial flux machine is known, for example, from the technical paper "Analysis of the Yokeless and Segmented Armature Machine," by T. J. Woolmer and M. D. McCulloch.

Electrical axial flux machines are known in various configurations. For example, axial flux machines that have a single armature active part and a single stator active part are known. Axial flux machines that have two stator active parts and a single armature active part or conversely have two armature active parts and a single stator active part are known.

In axial flux machines that have two armature active parts and a single stator active part, the axial flux machine may be configured without a stator yoke. In the prior art, the windings of the stator winding system are in the form of individual windings, which are each wound onto a coil former. The coil formers are mechanically stable elements and may be made of plastic. The coil formers are each plugged onto a stator tooth. The stator teeth are arranged and distributed over the circumference.

Axial flux machines offer the potential of providing a relatively high torque and a relatively high rated power given a relatively small and lightweight design. Axial flux machines are therefore used as compact traction drives in vehicles, for example. In the prior art mentioned at the outset, the intention is, for example, to use the axial flux machine described therein as a drive for a motor vehicle.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an axial flux machine with mechanical fixing of the stator teeth relative to one another and mechanical fixing of the stator as a whole in a housing that surrounds the stator radially on the outside while maintaining the relatively lightweight, simple design is provided.

In accordance with one or more of the present embodiments, an axial flux machine is configured such that the stator teeth are connected together in the end regions via a respective ring structure and to a housing surrounding the stator radially on the outside. The ring structures form a lightweight but nevertheless stable connection between the mentioned components.

The stator winding system includes windings. Within the scope of the disclosed axial flux machine, the windings may be wound onto coil formers that have been plugged onto the stator teeth. In one embodiment, the stator winding system may be wound directly onto the stator teeth. The coil formers that contribute (if even only relatively slightly) to the weight of the axial flux machine and take up an installation space volume (e.g., to a measurable extent) may therefore be dispensed with.

The stator winding system may include individual windings that are each wound onto an individual stator tooth. Owing to the direct winding of the stator winding system onto the stator teeth, however, the stator winding system may also be in the form of a distributed winding system. A distributed winding system has electromagnetic advantages over a winding system with individual windings, as in the case of a double-layer winding.

The ring structures may include a magnetically conductive material such as, for example, steel or other iron alloys. In one embodiment, the ring structures include an electrically nonconductive material so as to avoid eddy currents. The ring structures may also include a magnetically nonconductive material in order to avoid undesired influences on the electromagnetic behavior of the axial flux machine. The ring structures may be made of a fiber-reinforced plastic, for example. Examples of such plastics include carbon-fiber-reinforced plastics (CFRPs) or glass-fiber-reinforced plastics (GFRPs). The ring structures may have a solid design. In one embodiment, the ring structures may have a sandwich design, resulting in lightweight and nevertheless mechanically stable ring structures. The ring structures may be formed as closed rings when viewed tangentially around the axis of rotation and may be realized easily. Alternatively, the ring structures may be made of a number of ring segments, providing manufacturing-related advantages.

The ring structures may be formed as continuous structures when viewed radially with respect to the axis of rotation, providing ring structures that are stable. Alternatively, the ring structures may include a radially inner internal ring and a radially outer external ring, creating advantages in terms of manufacturing.

The ring structures may be arranged between the stator teeth on one side and the rotors on the other side when viewed in the direction of the axis of rotation, creating a simple configuration. Alternatively, the stator teeth may protrude inwards between the ring structures, or the stator teeth may protrude beyond the ring structures, resulting in a compact design of the axial flux machine.

In one configuration, the stator teeth have webs in the end regions, with the stator teeth in the end regions covering a greater angle when viewed around the axis of rotation than between the end regions. A webbed configuration may be advantageous in terms of fitting and may be advantageous during operation of the axial flux machine.

The connection of the stator teeth to the ring structures may be as desired. The stator teeth and the ring structures may be connected to one another in a form-fitting manner, a force-fitting manner, cohesively, or detachably.

DETAILED DESCRIPTION

Figure 1:
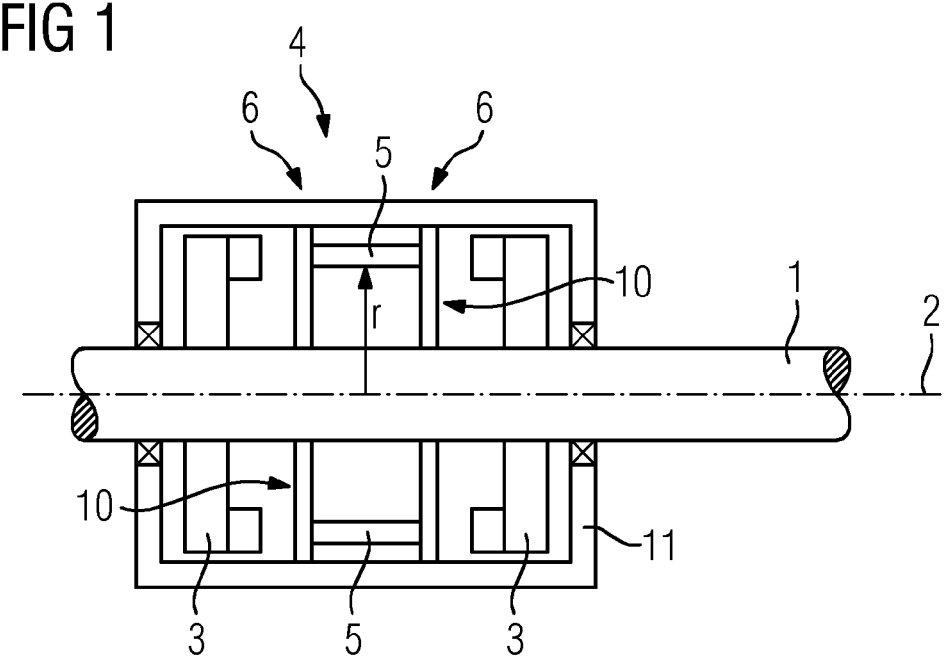
FIG. 1 illustrates a longitudinal section through an axial flux machine.

As shown in FIG. 1, an electrical axial flux machine has a rotor shaft 1. The rotor shaft 1 is rotatable about an axis of rotation 2. Two rotors 3 are arranged on the rotor shaft 1. The rotors 3 have a spacing from one another (i.e., are spaced apart from one another) in the axial direction (e.g., when viewed parallel to the axis of rotation 2). A stator 4 is arranged between the rotors 3 when viewed in the axial direction. The rotors 3 may have permanent magnets and magnetically conductive yokes.

Figure 2:
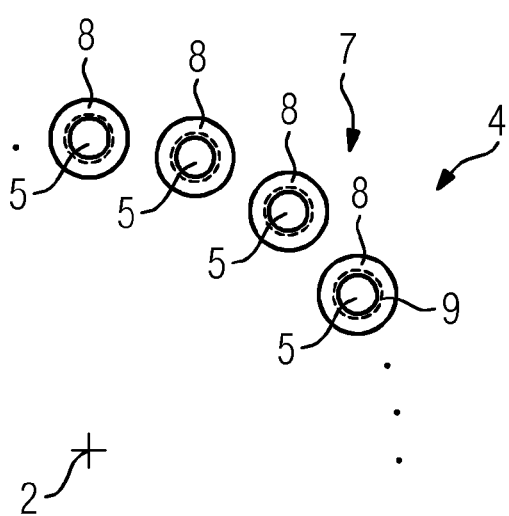
FIG. 2 illustrates a cross section through a stator of an axial flux machine.

As shown in FIG. 2, the stator 4 has a number of stator teeth 5. The stator teeth 5 may include laminated electrical sheet steel (e.g., SiFe, CoFe), for example. Alternatively, the stator teeth 5 may be pressed, for example, from soft magnetic composites (SMC) materials or sintered from magnetically conductive powder materials. The stator teeth 5 extend in the axial direction, as shown in FIG. 1, between two end regions 6. The respective axially outermost 10% or less of the stator teeth 5 or the respective axially outermost 5% or less of the stator teeth 5, may be considered as end regions 6. The stator teeth 5 are arranged at a radial spacing "r" from the axis of rotation 2. Stator teeth 5 are arranged and distributed uniformly when viewed in the tangential direction (e.g. around the axis of rotation 2). The stator teeth 5 bear a stator winding system 7, indicated schematically in FIG. 2. The stator winding system 7 may be wound directly onto the stator teeth 5. An insulating layer 9 (e.g., including paper) may be provided between the stator teeth 5 and the windings 8. However, a bearing structure that is mechanically stable (e.g. a coil former) may not be provided.

The stator teeth 5 are connected to one another in the end regions 6 via a respective ring structure 10. The stator teeth 5 are also connected to a housing 11 via the ring structures 10. The housing may surround the stator 4 radially on the outside. The connection of the ring structures 10 to the housing 11 may be as desired. For example, the housing 11 may be shrunk onto the ring structures 10. Alternatively, a form-fitting connection may be provided. For example, the ring structures 10 may have cutouts radially on the outside (e.g., U-shaped slots). Corresponding projections of the housing 11 engage into the cutouts. Alternatively, other types of connection may also be provided. For example, the ring structures 10 may be screwed or adhesively bonded to the housing 11.

Figure 3:
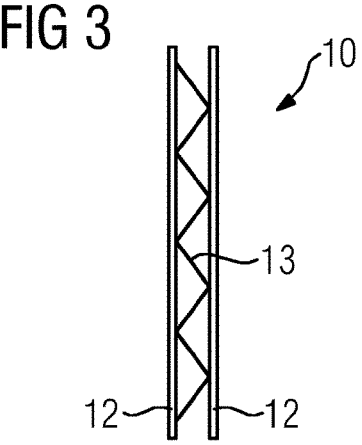
FIG. 3 illustrates a detail of a ring structure.

The ring structures 10 may be made of an electrically nonconductive and/or magnetically nonconductive material. The material may also be as lightweight as possible. For example, the ring structures 10 may be made of a fiber-reinforced plastic, such as CFRP or GFRP. In order to reduce the tare weight of the ring structures 10 as much as possible, the ring structures 10 may have a sandwich design, as shown in FIG. 3. The ring structures 10, as shown in FIG. 3, have a plurality of layers 12 that are connected to one another via a truss-like structure 13. In the configuration of the axial flux machine shown in FIGS. 1 and 2, the ring structures 10 are arranged in the axial direction between the stator teeth 5 on one side and the rotors 3 on the other side. This is shown by the perspective illustration in FIG. 4 and is shown in FIG. 5. In this configuration, the stator teeth 5 and the ring structures 10 may be connected to one another in virtually any desired manner. For example, the stator teeth 5 and the ring structures 10 may be connected to one another in a form-fitting manner. In order to realize a form-fitting connection, the ring structures 10 may have pins, for example, that extend in the axial direction. The stator teeth 5 may have corresponding cutouts engaging with the pins. As an alternative or in addition, the stator teeth 5 and the ring structures 10 may be cohesively connected to one another (e.g., adhesively bonded to one another or cast with one another). As an alternative to a cohesive connection, or as an alternative or in addition to a form-fitting connection, the stator teeth 5 and the ring structures 10 may be connected to one another detachably (e.g., screwed to one another).

During manufacture of the stator 4, the stator teeth 5 may be first connected to one ring structure 10 and only then to the other ring structure 10. In one embodiment, the stator winding system 7 includes individual windings 8, as illustrated in FIG. 2. For example, the stator teeth 5 may have the stator winding system applied prior to connection to the one ring structure 10 and may then be connected to the ring structure 10. As an alternative, the stator teeth 5 may be connected to the one ring structure 10 prior to the winding process being performed. The stator winding system 7 may include the individual windings 8. If the stator teeth 5 are connected to the one ring structure 10 prior to the winding process, the stator winding system 7 may be in the form of a distributed winding system, whether it be in the form of a single-layer winding or a double-layer winding.

Figure 4:
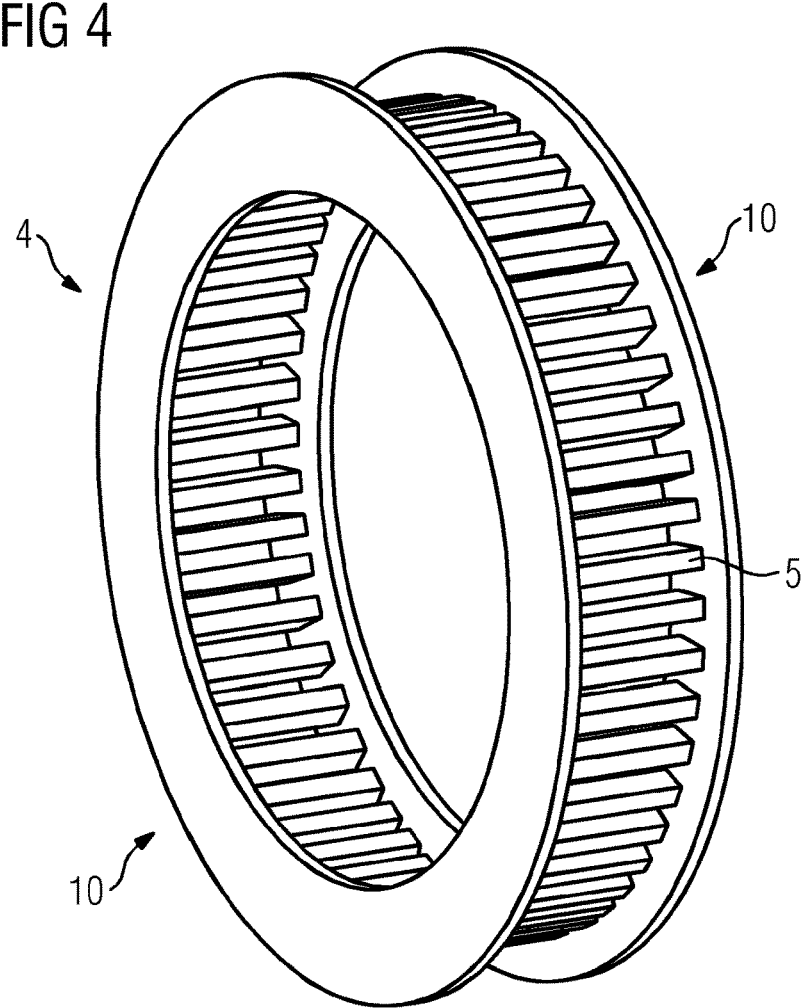
FIG. 4 shows a perspective illustration of a stator.
Figure 5:
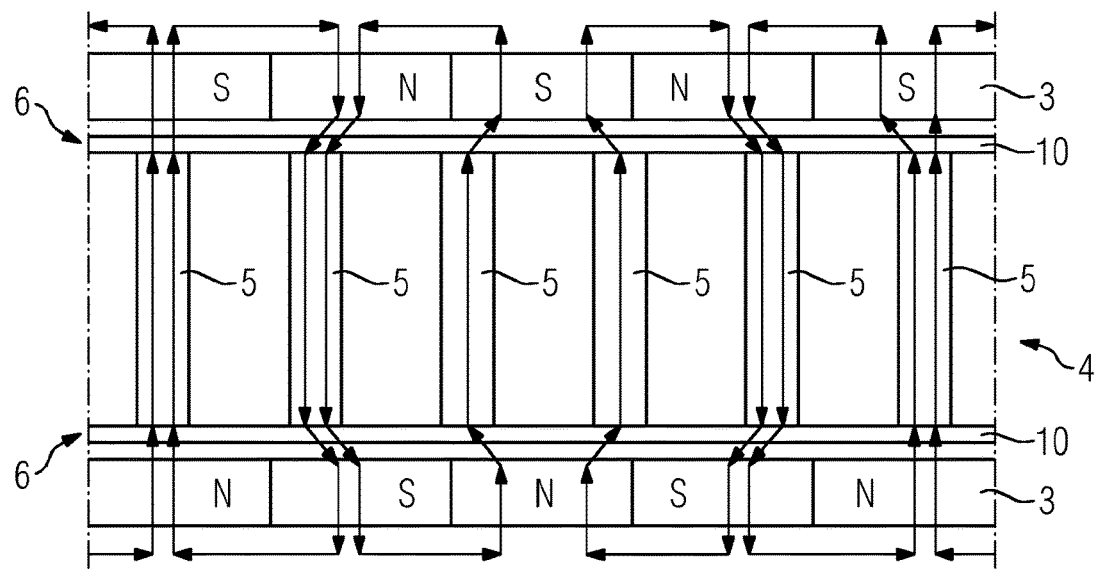
FIG. 5 shows an axial flux machine in a developed illustration.

The ring structures 10 are formed as continuous structures in the radial direction (e.g. when viewed towards the axis of rotation 2 or away from the axis of rotation), as shown in FIGS. 1 and 4 (e.g., the ring structures extend in the radial direction without any interruption integrally from a minimum spacing from the axis of rotation 2 up to a maximum spacing from the axis of rotation 2). Alternatively, the ring structures 10 may include a radially inner internal ring 14 and a radially outer external ring 15, when viewed in the radial direction, as shown in FIGS. 6 and 7.

When the ring structures 10 are split into the internal ring 14 and the external ring 15, as has already been mentioned in conjunction with FIGS. 1 and 4, the ring structures 10 may be connected to the stator teeth 5 in a form-fitting manner, cohesively or detachably. Alternatively, the ring structures 10 may be split into the internal ring 14 and the external ring 15, with the stator teeth 5 and the ring structures 10 connected to one another, at least partially, in a force-fitting manner. For example, the external ring 15 may be shrunk onto the stator teeth 5 from radially outwards. The stator teeth 5 may also be pressed against the internal ring 14 from radially outwards.

Similarly, the ring structures 10 shown in FIGS. 1 and 4 are in the form of closed rings when viewed in the tangential direction. Alternatively, the ring structures 10 shown in FIGS. 6 and 7 may include a number of ring segments 16 and 17. The ring segments 16 and 17 extend in the tangential direction over a plurality of stator teeth 5. The ring segments 16 and 17 may each be connected to from four to ten stator teeth 5. As an alternative or in addition, the ring segments 16 and 17 extend, in relation to the axis of rotation 2, over a circumferential angle between approximately 10° and 60°.

Figure 6:
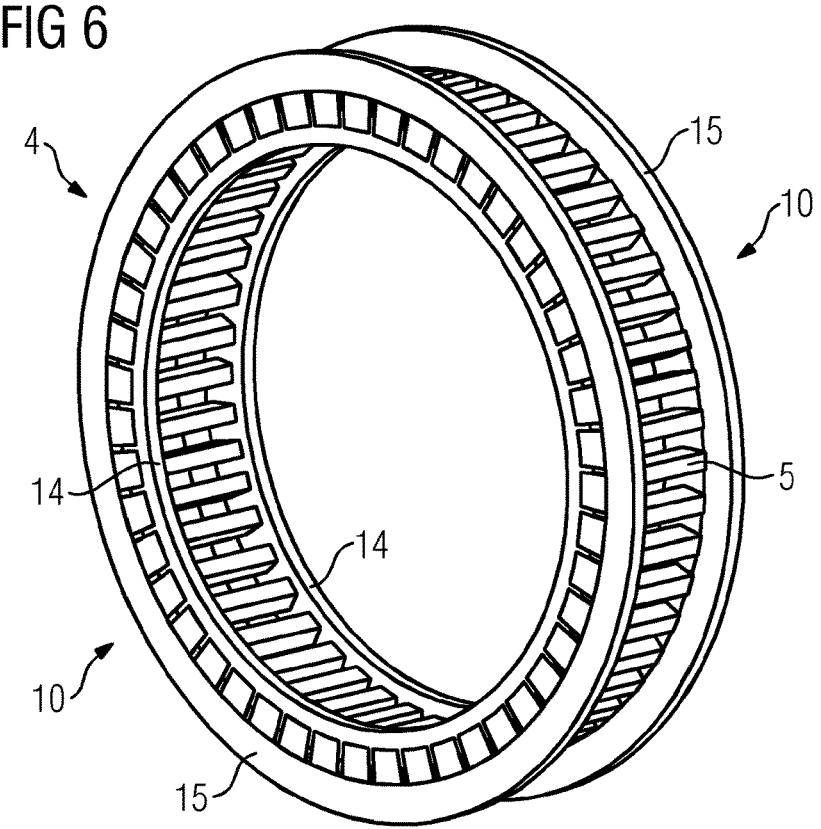
FIG. 6 shows a perspective illustration of a further stator.
Figure 7:
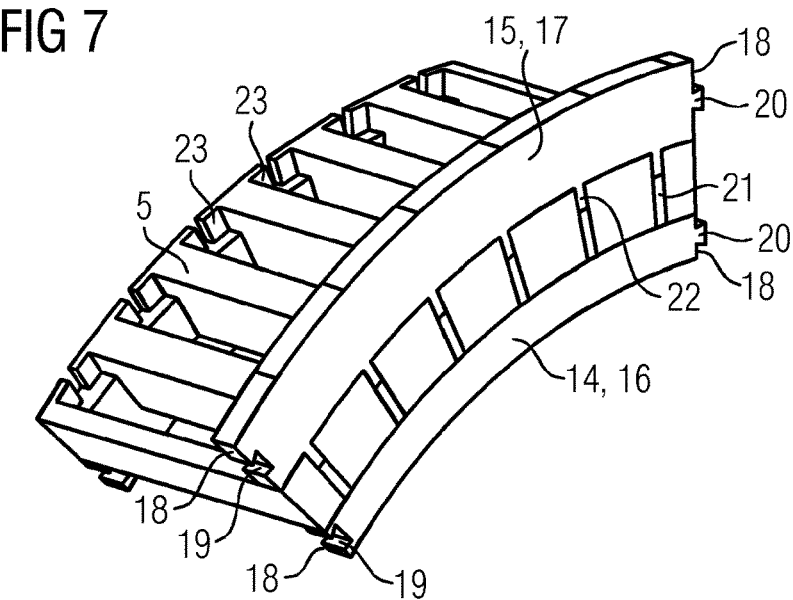
FIG. 7 illustrates a detail from FIG. 6.

Splitting of the ring structures 10 into the ring segments 16 and 17 is illustrated in FIGS. 6 and 7 in conjunction with splitting of the ring structures 10 into the internal ring 14 and the external ring 15. Splitting of the ring structures 10 into the ring segments 16 and 17 may likewise be realized without splitting of the ring structures 10 into the internal ring 14 and the external ring 15, however.

When the ring structures 10 are split into the ring segments 16 and 17, the ring segments 16 and 17 may be connected to one another, for example, in a form-fitting manner. For example, the ring segments 16 and 17 shown in FIG. 7 may have dovetail-like cutouts 19 and corresponding dovetail-like projections 20 at corresponding abutting faces 18, with the result that the ring segments 16 and 17 may be connected in a form-fitting manner to one another to form the internal ring 14 and the external ring 15 or, in the case of a radially continuous structure, to form the respective ring structure 10.

The internal ring 14 and/or the external ring 15, or the corresponding ring segments 16 and 17, may have webs 21 and 22, extending from the internal ring 14 towards the external ring 15 or conversely from the external ring 15 towards the internal ring 14. If both the webs 21 and the webs 22 are provided, the webs 21 and 22 may be abut one another or be spaced apart from one another. If only the webs 21 or only the webs 22 are provided, the provided webs 21 and 22 may alternatively abut the respective other ring 15, 14 or be spaced apart therefrom.

FIGS. 6 and 7 show some further modifications of the stator 4 of the axial flux machine. These modifications, which will be explained in more detail below, may optionally be implemented as an alternative or in addition to the above-explained configurations. Thus, a configuration in which the stator teeth 5 have webs 23 in the end regions 6 is illustrated by way of example in FIGS. 6 and 7. The webs 23 extend, starting from the respective stator tooth 5, in the tangential direction towards the two stator teeth 5, which are directly adjacent with respect to the respective stator tooth 5. The stator teeth 5 thus cover a greater angle in the end regions 6 in the tangential direction than between the end regions 6.

The stator teeth 5, as shown in FIG. 7, may protrude beyond the ring structures 10 when viewed in the axial direction. This configuration is advantageous when the webs 23 are provided. The webs 23 of the stator teeth 5 may be arranged axially outside the ring structures 10. Protruding beyond the ring structures 10 is also possible, however, when the webs 23 are not provided.

If the stator teeth 5 protrude beyond the ring structures 10 in the axial direction, the ring structures 10 may be divided into the internal ring 14 and the external ring 15, as shown in FIGS. 6 and 7. This, however, is not necessary.

As a possible alternative, the stator teeth 5 may protrude inwards between the ring structures 10 but not protrude beyond the ring structures 10. An axially inner region of the stator 4 is adjoined in the direction towards the two rotors 3, in each case by an axially central region of the stator 4, and in each case, an axially outer region of the stator 4 adjoins the axially central region. The axially inner region of the stator 4 includes the stator teeth 5 and the stator winding system 7 but not constituent parts of the ring structures 10. The end regions 6 of the stator teeth 5 and axially inner regions of the ring structures 10 are located in the axially central regions of the stator 4. Only axially outer regions of the ring structures 10, but no constituent parts of the stator teeth 5 are located in the axially outer regions of the stator 4.

When the stator teeth 5 protrude inwards in the axial direction between the ring structures 10, the ring structures 10 may be divided, as previously, into the internal ring 14 and the external ring 15. This, however, is not necessary.

Figure 8:
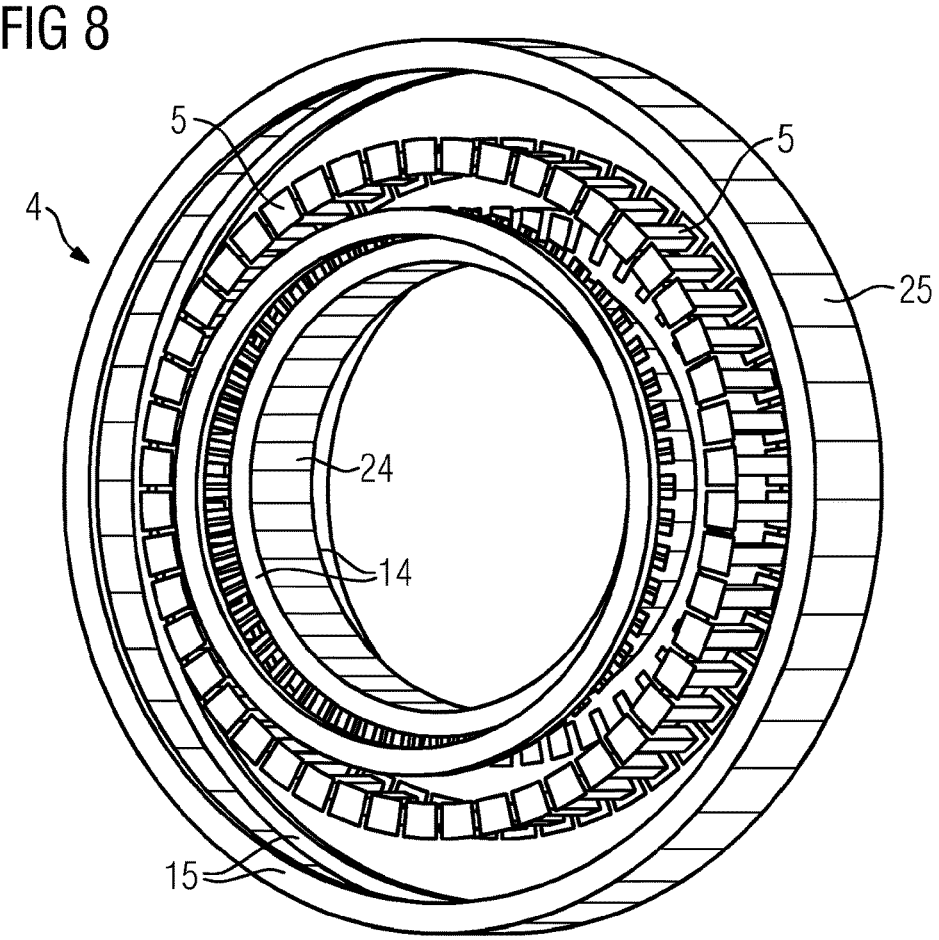
FIG. 8 shows a further perspective illustration of a stator.
Figure 9:
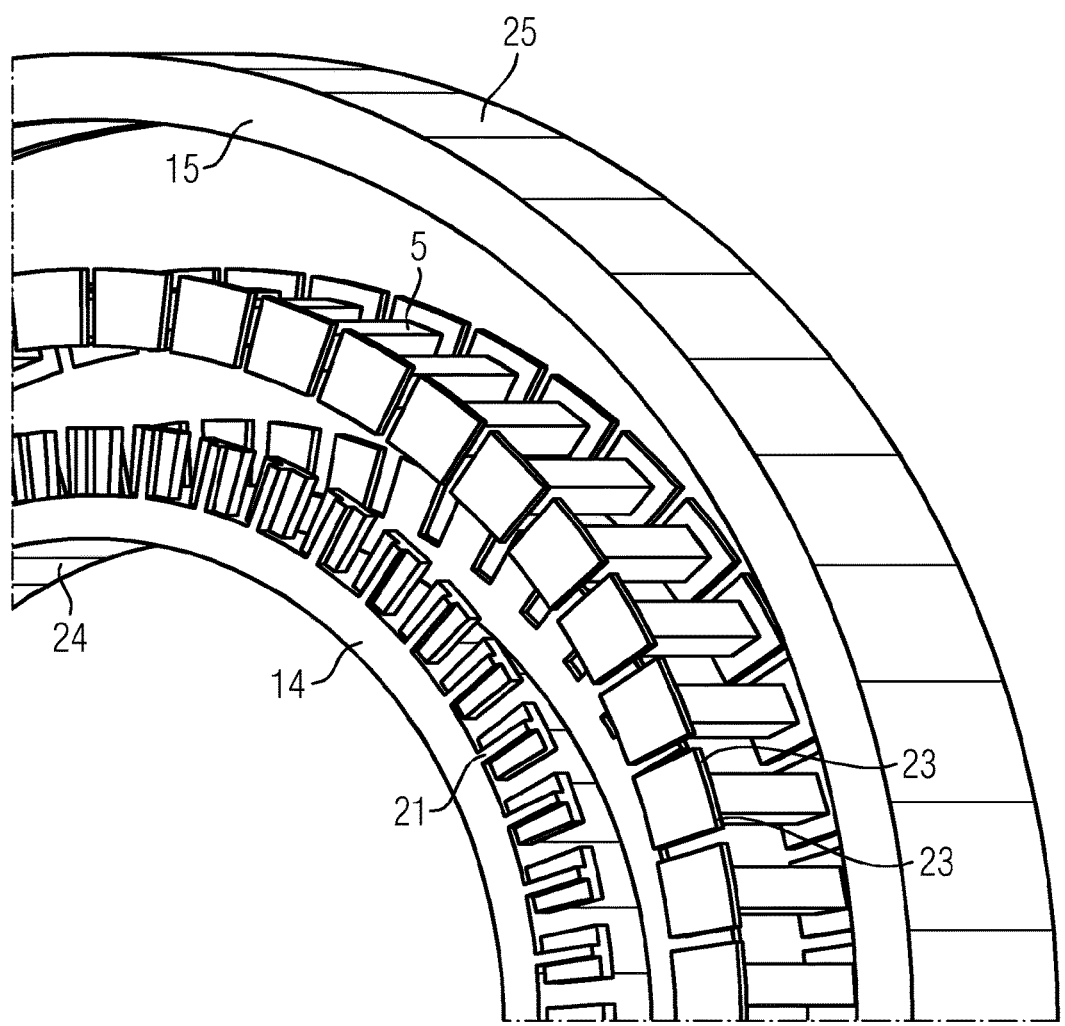
FIG. 9 illustrates a detail from FIG. 8.

FIGS. 8 and 9 show another possible modification of the stator 4. As shown in FIGS. 8 and 9, the ring structures 10 are divided into the internal rings 14 and the external rings 15. The internal rings 14 are connected to one another via an inner connecting structure 24. The inner connecting structure 24 may be alternatively punctiform or closed. A punctiform connecting structure 24 may be implemented, for example, by a grid structure, by a truss structure, or by simple rods extending purely axially. Similarly, the external rings 15 are connected to one another via an outer connecting structure 25. The outer connecting structure 25 may, similarly to the inner connecting structure 24, alternatively be punctiform or closed. Where the two connecting structures 24 and 25 are closed, an independent coolant circuit may be realized in the space surrounded by the two connecting structures 24 and 25, for example.

An inner unit formed by the two internal rings 14 and the inner connecting structure 24 may be integral. As an alternative, the inner unit may be segmented in the tangential direction. The same applies to an outer unit formed by the two external rings 15 and the outer connecting structure 25.

As shown in FIGS. 8 and 9, the internal rings 14 have the webs 21. The stator teeth 5 are held and fixed by the webs 21 by a form-fitting connection. If the stator teeth 5 include webs 23, then webs 21, as shown in FIG. 9, are correspondingly contoured. As an alternative to the provision of the webs 21, the webs 22 may be provided, with the above statements applying to the webs 22 instead of to the webs 21. Alternatively, both the webs 21 and the webs 22 may be provided and the inner unit and/or the outer unit is/are segmented.

The ring structures 10 and the stator teeth 5 are connected in the configuration shown in FIGS. 8 and 9 by a form-fitting connection (e.g., by a shrink fit). However, other types of connection are also possible.

The disclosed axial flux machine is used as a traction drive, for example, in a rail vehicle. In principle, the disclosed axial flux machine is universally usable, however (e.g., in road vehicles, water craft, aircraft, or in a stationary application).

The disclosed axial flux machine has many advantages including the enablement of simple, stepwise manufacture of the axial flux machine.

Although the invention has been illustrated and described in detail herein, the invention is not restricted by the disclosed examples and other variations may be derived from this by a person skilled in the art without departing from the scope of protection of the invention. It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. An electrical axial flux machine comprising:
a rotor shaft that is rotatable about an axis of rotation, two rotors being arranged on the rotor shaft, the two rotors being spaced apart from one another when viewed in a direction of the axis of rotation;
a stator arranged between the two rotors when viewed in the direction of the axis of rotation, the stator having a plurality of stator teeth, wherein each respective stator tooth of the plurality of stator teeth extends in the direction of the axis of rotation between an inner end region and an outer end region, wherein the stator teeth are arranged and distributed uniformly around the axis of rotation at a radial spacing from the axis of rotation and bear a stator winding system; and
a ring structure, when viewed radially with respect to the axis of rotation, comprises two radially inner internal rings and two radially outer external rings, wherein the stator teeth are connected to one another at the inner end region via a first internal ring and a second internal ring of the ring structure, and at the outer end region via a first outer ring and a second outer ring of the ring structure, and
wherein the stator teeth are connected to a housing surrounding the stator radially on the outside.

2. The axial flux machine of claim 1, wherein the stator winding system is wound directly onto the plurality of stator teeth.

3. The axial flux machine of claim 2, wherein the stator winding system comprises:
a plurality of individual windings, each individual winding of the plurality of individual windings being wound onto an individual stator tooth or the plurality of individual windings being in a form of a distributed winding system.

4. The axial flux machine of claim 1, wherein the ring structure comprises an electrically nonconductive, magnetically nonconductive material, or electrically nonconductive and magnetically nonconductive material.

5. The axial flux machine of claim 4, wherein the ring structure comprises a fiber-reinforced plastic.

6. The axial flux machine of claim 1, wherein the ring structure has a sandwich design.

7. The axial flux machine of claim 1, wherein the ring structure comprises a plurality of closed rings when viewed tangentially around the axis of rotation or comprises a plurality of ring segments.

8. The axial flux machine of claim 1, wherein, when viewed in the direction of the axis of rotation, the ring structure is arranged between the plurality of stator teeth, on one side, and the two rotors, on the other side, or the plurality of stator teeth protrude inwards between the ring structure or protrude beyond the ring structure.

9. The axial flux machine of claim 1, wherein the plurality of stator teeth has webs in the two end regions, with the result that the plurality of stator teeth in the two end regions cover a greater angle, when viewed around the axis of rotation than between the two end regions.

10. The axial flux machine of claim 1, wherein the plurality of stator teeth and the ring structure are connected to one another in a form-fitting manner, in a force-fitting manner, cohesively, or detachably.

11. The axial flux machine of claim 2, wherein the ring structure comprises an electrically nonconductive, magnetically nonconductive, or electrically nonconductive and magnetically nonconductive material.

12. The axial flux machine of claim 3, wherein the ring structure comprises an electrically nonconductive, magnetically nonconductive, or electrically nonconductive and magnetically nonconductive material.

13. The axial flux machine of claim 4, wherein the ring structure comprises CFRP or GFRP.

14. The axial flux machine of claim 1, wherein the ring structure comprises a plurality of ring segments.

15. The axial flux machine of claim 1, wherein, when viewed in the direction of the axis of rotation, the plurality of stator teeth protrudes inwards between the radially inner internal rings and the radially outer external rings of the ring structure.

16. The axial flux machine of claim 1, wherein, when viewed in the direction of the axis of rotation, the plurality of stator teeth protrudes beyond the radially inner internal rings or the radially outer external rings of the ring structure.

* * * * *